US005759439A

United States Patent [19]

Kott et al.

[11] Patent Number: 5,759,439

[45] Date of Patent: Jun. 2, 1998

[54] PEROXYGEN BLEACHING COMPOSITIONS COMPRISING PEROXYGEN BLEACH AND A FABRIC PROTECTION AGENT SUITABLE FOR USE AS A PRETREATER FOR FABRICS

[75] Inventors: Kevin Lee Kott, Cincinnati; Patti Jean Kellett, West Chester, both of Ohio; Valentina Masotti, Casalecchio di Reno; Stefano Scialla, Roma, both of Italy; Alan David Willey, Cincinnati, Ohio

[73] Assignee: The Procter & Gamble Company, Cincinnati, Ohio

[21] Appl. No.: 663,501

[22] Filed: Jun. 14, 1996

[51] Int. Cl.$^6$ .......................... C01B 15/00; C01B 15/04; C01B 15/055; C11D 3/39

[52] U.S. Cl. .......................... 252/186.25; 252/186.26; 252/186.27; 252/186.29; 252/186.31; 252/186.38; 510/309; 510/312

[58] Field of Search .......................... 252/186.25, 186.26, 252/186.27, 186.28, 186.29, 186.3, 186.31, 186.38, 186.39; 510/309, 312

[56] References Cited

U.S. PATENT DOCUMENTS

| | | | |
|---|---|---|---|
| 4,110,262 | 8/1978 | Arnau et al. | 510/340 |
| 4,130,501 | 12/1978 | Lutz et al. | 252/186.28 |
| 4,496,473 | 1/1985 | Sanderson | 252/186.41 |
| 4,830,997 | 5/1989 | Trinh et al. | 502/28 |
| 4,891,147 | 1/1990 | Gray et al. | 510/303 |
| 4,966,723 | 10/1990 | Hodge et al. | 252/186.4 |
| 5,019,289 | 5/1991 | Gray et al. | 510/303 |
| 5,130,053 | 7/1992 | Feasey et al. | 252/186.29 |
| 5,332,527 | 7/1994 | Heinzman et al. | 510/361 |
| 5,364,549 | 11/1994 | McDonogh | 252/79.4 |
| 5,503,639 | 4/1996 | Willey et al. | 8/111 |
| 5,716,923 | 2/1998 | MacBeath | 510/313 |

FOREIGN PATENT DOCUMENTS

| | | | |
|---|---|---|---|
| 0 209 228 A1 | 1/1987 | European Pat. Off. | C11D 3/39 |
| 0 351 772 A2 | 1/1990 | European Pat. Off. | C01B 15/037 |
| 0 629 690 A1 | 12/1994 | European Pat. Off. | C11D 1/825 |
| 0 629 691 A1 | 12/1994 | European Pat. Off. | C11D 3/37 |
| 0013 886 A1 | 12/1994 | European Pat. Off. | C11D 3/39 |
| 3430-773-A | 3/1985 | Germany | C11D 7/54 |
| 57-060-00 | 4/1982 | Japan | C11D 7/54 |
| WO 94/03553 | 2/1994 | WIPO | C09K 15/20 |

OTHER PUBLICATIONS

Purification and some characteristics of nitric oxide reductase–containing vesicles from Paracoccus denitrificans. Hoglen, James, Hollocher, Thomas; J. Biol. Chem. 1989 (264) 13, 7556–63.

*Primary Examiner*—Joseph D. Anthony
*Attorney, Agent, or Firm*—Robert B. Aylor

[57] ABSTRACT

The present invention relates to aqueous, acidic compositions comprising a peroxygen bleach and a specific fabric protection agent. The present invention further encompasses a process for pretreating soiled fabrics whereby the loss of tensile strength in said fabric is reduced and the color/dye damage of said fabric is reduced.

11 Claims, No Drawings

PEROXYGEN BLEACHING COMPOSITIONS COMPRISING PEROXYGEN BLEACH AND A FABRIC PROTECTION AGENT SUITABLE FOR USE AS A PRETREATER FOR FABRICS

TECHNICAL FIELD

The present invention relates to aqueous bleach-containing compositions suitable for use as pretreater and to a pretreatment process whereby fabric safety and/or color safety is improved. The bleaching compositions are preferably acidic and comprise peroxygen bleach, preferably hydrogen peroxide or a source thereof, and a fabric protection agent.

BACKGROUND OF THE INVENTION

Bleaching compositions have been extensively described in laundry applications as laundry detergents, laundry additives or even laundry pretreaters.

Indeed, it is known to use such bleach-containing compositions in laundry pretreatment applications to boost the removal of encrusted stains/soils and "problem" stains, such as grease, coffee, tea, grass, mud/clay-containing soils, which are otherwise particularly difficult to remove by typical machine washing. However, a drawback associated with such bleach-containing compositions is that said compositions may damage fabrics, resulting in dye damage and/or loss of tensile strength of the fabric fibers, especially when used in pretreatment applications under stressed conditions, e.g. when applied directly onto the fabric and left to act on said fabric for prolonged periods of time before washing said fabrics, especially when the fabric to be treated is contaminated with metal ions such as copper, iron, manganese, or chromium. Without being limited by theory, it is believed that the peroxygen bleach can be responsible for the dye and fabric damage associated with these bleaching compositions. It is further believed that these metal ions on the surface of the fabrics, especially on cellulosic fabrics, catalyze the decomposition of peroxygen bleaches like hydrogen peroxide. Thus, the accelerated decomposition of the peroxygen bleach can result in fabric and/or dye damage.

When said compositions are applied directly to fabrics, the different components in said compositions diffuse or migrate, possibly at different rates, through the fabric fibers. This is also true for the peroxygen bleach component of bleaching compositions designed for the pretreatment of fabrics.

A solution to the damage resulting from pretreating fabrics with bleaching compositions comprising peroxygen bleach is provided by adding certain fabric protection agents which act to reduce fabric and/or dye damage. These fabric protection agents have been found to considerably reduce the damage associated with the treatment of fabrics with peroxygen bleach-containing compositions, especially those fabrics which are contaminated with metal ions. Suitable fabric protection agents are characterized by sufficiently high stability constants for metal ions, such as copper or iron, to prevent, slow, and/or minimize, the metal ion catalyzed decomposition of the peroxygen bleach. Moreover, the fabric protection agent should have sufficiently high mobility to ensure that the fabric protection agents migrates along with the peroxygen bleach as the bleach spreads or migrates throughout the fabric fibers upon the application of the bleaching composition onto the fabric.

Accordingly, the present invention solves the long-standing need for an effective, dye-safe bleaching composition suitable for use as a pretreater which does not promote damage to fabrics. Moreover, the compositions of the present invention provide excellent performance when used in other applications apart from laundry pretreater application, such as in other laundry applications, as a laundry detergent or laundry additive, or even in hard surface cleaning applications, or in carpet cleaning applications.

BACKGROUND ART

Peroxygen bleach-containing compositions have been extensively described in the art. For example EP-629,691A discloses emulsions of nonionic surfactants comprising a silicone compound, and as optional ingredients, hydrogen peroxide, or a water soluble source thereof. EP-629,690A discloses emulsions of nonionic surfactants comprising a terephthalate-based polymer, and as optional ingredients, hydrogen peroxide, or a water soluble source thereof. EP-209,228B discloses compositions comprising a peroxide source like hydrogen peroxide. EP-209,228B discloses that the hydrogen peroxide-containing compositions may be used as pre-spotters. See also U.S. Pat. No. 4,891,147, issued Jan. 2, 1990, and U.S. Pat. No. 5,019,289, issued May 28, 1991.

SUMMARY OF THE INVENTION

The present invention encompasses an aqueous composition comprising a peroxygen bleach, such as hydrogen peroxide or a source thereof, and a fabric protection agent; wherein said fabric protection agent has a mobility factor greater than 0.7, as defined hereinafter; said fabric protection agent has a stability constant of at least log K=3 for $Cu^{2+}$. Further, the minimum concentration, C, of the fabric protection agent, measured as a weight percentage of said liquid bleaching composition, is calculated by the following formula: $\{[C]*[\text{stability constant for } Cu^{2+}]\} \geq 2.5$. Preferably, the fabric protection agents have a ratio of stability constant for copper(2+) to stability constant for calcium(2+) of at least about 2:1.

The present invention further encompasses a process of pretreating soiled fabrics with a liquid, aqueous composition comprising a peroxygen bleach and a fabric protection agent having a mobility factor higher than 0.7, when measured as defined herein, said process comprising the steps of applying said composition, preferably in its neat form, onto the fabric and allowing said composition to remain in contact with said fabric, preferably without leaving said composition to dry on the fabric, before said fabric is washed.

In yet another process, the aqueous composition is applied to soiled fabrics before said fabrics are washed, whereby the loss of tensile strength in said fabric is reduced as compared to fabrics which have been treated with similar peroxygen bleaching compositions, but without the fabric protection agents of this invention.

In still yet another process, the aqueous composition is applied to colored/dyed fabrics before said fabrics are washed, whereby dye damage of said fabric is reduced and whereby the loss of tensile strength in said fabric is reduced as compared to fabrics which have been treated with similar peroxygen bleaching compositions but without the fabric protection agents of this invention.

By "pretreat soiled fabrics" it is to be understood that the aqueous composition is applied in its neat form onto the soiled fabric and left to act on said fabric before said fabric is washed. Alternatively, the aqueous composition may be applied to the fabric substrate along with enough water to wet the fabric.

In preferred embodiments, the present aqueous compositions have a pH of from greater than 0 to about 6 and a viscosity of 50 cps, or greater, preferably from about 50 to about 2000 cps, at 20° C. when measured with a Brookfield viscometer at 50 rpm with a spindle n°3.

All percentages, ratios, and proportions herein are by weight, unless otherwise specified. All documents cited are incorporated herein by reference.

DETAILED DESCRIPTION OF THE INVENTION

The present invention encompasses an aqueous composition comprising a peroxygen bleach, such as hydrogen peroxide or a source thereof, and a fabric protection agent. These fabric protection agents have been found to considerably reduce the damage associated with the treatment of fabrics with peroxygen bleach-containing compositions, especially those fabrics which are contaminated with metal ions, such as copper, iron, chromium, and manganese. Suitable fabric protection agents are characterized by sufficiently high stability constants for metal ions, such as copper or iron, to prevent the metal ion catalyzed decomposition of the peroxygen bleach. Moreover, the fabric protection agent should have sufficiently high mobility to ensure that the fabric protection agents migrates along with the peroxygen bleach as the bleach spreads or migrates throughout the fabric fibers upon the application of the bleaching composition onto the fabric.

The fabric protection agents of this invention are characterized by having a mobility factor (defined hereinbelow) higher than 0.7, preferably higher than about 0.8, more preferably higher than about 0.9. Additionally, said fabric protection agents have a stability constant for copper(2+) of at least log K=3, more preferably at least log K=6, still more preferably at least log K=9, at a temperature of 25° C. and an ionic strength of 0.1. Further, said fabric protection agents preferably have a stability constant for iron (Fe3+) of at least log K=6, more preferably at least log K=9, still more preferably at least log K=12, at a temperature of 25° C. and an ionic strength of 0.1. In more preferred embodiments, the fabric protection agents have a ratio of stability constant for copper(2+) to stability constant for calcium(2+) of at least about 3:1, more preferably at least about 4:1. Stability constants are further defined in and procedures for the experimental determination of are included in Martell, A. E.; Smith, R. M. *Critical Stability Constants*, Plenum Press: New York, 1974; Volume 1, and references cited therein. By "stability constant" herein is meant log K values also designated as "log $K_1$" as defined in Martell, cited above.

Fabric protection agents herein preferably comprise at least two moieties capable of chelating or binding metal ions, such as carboxylic, amino (primary, secondary, or tertiary), amido, hydroxy moieties, and mixtures thereof. Those skilled in the art will recognize that "carboxylic" means either carboxylic acid or the unprotonated carboxylate. Highly preferred fabric protection agents of this invention can be selected from the group consisting of glycine, salicylic acid, 5-sulfosalicylic acid, 5-bromosalicylic acid, 5-chlorosalicylic acid, aspartic acid, glutamic acid, malonic acid, the corresponding conjugate base salts (i.e., monosodium glutamate), and mixtures thereof. Structures for these compounds are:

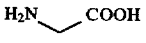

glycine

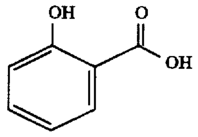

salicylic acid

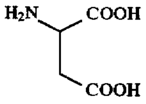

aspartic acid

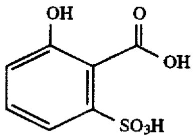

5-sulfosalicylic acid

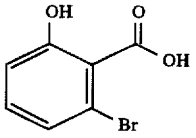

5-bromosalicylic acid

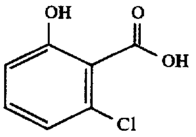

5-chlorosalicylic acid

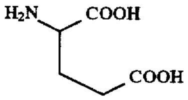

glutamic acid

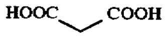

malonic acid.

In highly preferred embodiments of this invention, fabric protection agents which have a ratio of stability constants for copper(2+) to calcium(2+) at least about 4:1 include those agents selected from the group consisting of glycine, salicylic acid, 5-sulfosalicylic acid, 5-bromosalicylic acid, 5-chlorosalicylic acid, glutamic acid, aspartic acid, the corresponding conjugate base salts (i.e., monosodium glutamate), and mixtures thereof.

The especially preferred embodiment of these fabric protection agents are those selected from the group consisting of salicylic acid and its derivatives, including 5-sulfosalicylic acid, 5-bromosalicylic acid, 5-chlorosalicylic acid, the corresponding conjugate base salts, and mixtures thereof.

The minimum concentration of the fabric protection agents in the bleaching composition can be calculated from the formula: (C)(stability constant for $Cu^{2+}$)≧2.5, more preferably≧5, where C is the weight percent of fabric protection agent in the bleaching composition. In any case, the concentration of the fabric protection agent should be less than about 50% of the total bleaching composition. As an example, if the stability constant for $Cu^{2+}$for a particular fabric protection agent is 3, the concentration can be calculated by (C)(3)≧2.5, or C is 0.83% of the total bleaching composition.

In any event, a preferred range of fabric protection agent will comprise from about 0.3% to about 3%, more preferably from about 1% to about 1.5%, by weight of the total bleaching composition.

The compositions according to the present invention are aqueous liquid cleaning compositions. Said aqueous compositions should be formulated in the acidic pH, preferably at a pH of from greater than 0 to about 6 and more preferably at a pH of from 3 to 5. Formulating the compositions of the present invention in the acidic pH range contributes to the stability of said compositions. The pH of the compositions of the present invention can be adjusted by using organic or inorganic acids or bases.

By "fabric damage" herein is meant the degree of tensile strength loss of a fabric. Tensile strength loss may be measured by employing the Tensile Strength Loss Test, as can be seen in Example II hereinafter.

Mobility Factor—The mobility factor is a measure of the fabric protection agent's ability to migrate on a cellulose substrate and is experimentally determined in a thin layer chromatography test. The thin layer chromatography test is conducted as follows. A sample of the fabric protection agent candidate to be measured is spotted onto a Baker-flex Cellulose F indicating thin layer chromatography plate using a capillary applicator and subsequently developed in an enclosed chamber using 0.001N aqueous acetic acid:ethanol (50:50 mixture) as the elutant. After drying, the plates are visualized under UV/vis light or exposure to iodine vapor. The "mobility factor" as used herein is thus defined as the retention factor ($R_f$), commonly recognized by those skilled in the art as the distance in which the sample moved divided by the distance in which the solvent front moved on the thin layer chromatography plate.

Therefore, the mobility factor, equal to the retention factor, ranges from 0 to 1, with 1 being the highest mobility. The fabric protection agents of this invention possess excellent mobility on cellulose, as measured by this mobility test. In fact, the highly preferred fabric protection agents herein have a mobility factor of 0.9 or above.

Said thin layer chromatography methods are well known in the art and are described for example in Touchstone, J. C. *Practice of Thin Layer Chromatography, 3rd Edition*, John Wiley & Sons: New York, 1992.

Peroxygen Bleach—An essential element of the compositions of the present invention is peroxygen bleach. A preferred peroxygen bleach herein is hydrogen peroxide or a water soluble source thereof or mixtures thereof. Hydrogen peroxide is most preferred. Indeed, the presence of peroxygen bleach, preferably hydrogen peroxide, provides strong cleaning benefits which are particularly noticeable in laundry applications. As used herein, a hydrogen peroxide source refers to any compound which produces hydrogen peroxide when said compound is in contact with water.

Suitable water-soluble sources of hydrogen peroxide for use herein include sodium carbonate peroxyhydrate or equivalent percarbonate salts, persilicate, perborates, e.g., sodium perborate (any hydrate but preferably the mono- or tetra-hydrate), sodium pyrophosphate peroxyhydrate, urea peroxyhydrate, sodium peroxide, and mixtures thereof. Alternative peroxygen sources include persulfates such as monopersulfate, peroxyacids such as diperoxydodecandioic acid (DPDA), magnesium perphthalatic acid, perbenzoic and alkylperbenzoic acids, and mixtures thereof.

An "effective amount" of a peroxygen bleach is any amount capable of measurably improving soil/stain removal from the soiled fabric substrate compared to a peroxygen bleach-free composition when the soiled substrate is washed by the consumer in the presence of alkali. Typically, the compositions of the present invention comprise from 0.5% to 20% by weight of the total composition of said peroxygen bleach, preferably from 2% to 15% and most preferably from 1% to 6%.

Optional Bleach Activators—The peroxygen-containing compositions herein may optionally, but preferably, further comprise a bleach activator. By bleach activator, it is meant herein a compound which reacts with hydrogen peroxide to form a peracid. The peracid thus formed constitutes the activated bleach. Particularly preferred is acetyl triethyl citrate. Said bleach activators, if present, will typically comprise from about 0.5% to about 20%, preferably from 2% to 10%, most preferably from 3% to 7%, by weight of the total composition.

Bleach activators suitable herein are any known activators typified by NOBS (nonanoyl oxybenzenesulfonate), TAED (tetraacetylethylenediamine), or ATC (acetyl triethyl citrate). Numerous other bleach activators are known. See for example activators referenced in U.S. Pat. No. 4,915,854, issued Apr. 10, 1990 to Mao et al, and U.S. Pat. No. 4,412,934. See also U.S. Pat. No. 4,634,551 for other typical conventional bleach activators. Also known are amido-derived bleach activators of the formulae: $R^1N(R^5)C(O)R^2C(O)L$ or $R^1C(O)N(R^5)R^2C(O)L$ wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. Further illustration of bleach activators of the above formulae include (6-oct-anamidocaproyl)-oxybenzenesulfonate, (6-nonanamidocaproyl)oxybenzenesulfonate, (6-decanamidocaproyl)oxybenzenesulfonate, and mixtures thereof as described in U.S. Pat. No. 4,634,551. Another class of bleach activators comprises the benzoxazin-type activators disclosed by Hodge et al in U.S. Pat. No. 4,966,723, issued Oct. 30, 1990. Still another class of bleach activators includes acyl lactam activators such as substituted and unsubstituted benzoyl caprolactam, t-butylbenzoylcaprolactam, n-octanoyl caprolactam, 3,5,5-trimethylhexanoyl caprolactam, nonanoyl caprolactam, decanoyl caprolactam, undecenoyl caprolactam, octanoyl valerolactam, decanoyl valerolactam, undecenoyl valerolactam, nonanoyl valerolactam, 3,5,5-trimethylhexanoyl valerolactam, t-butylbenzoylvalerolactam and mixtures thereof.

Preferred bleach activators useful herein include those selected from the group consisting of acetyl triethyl citrate, n-octanoyl caprolactam, 3,5,5-trimethylhexanoyl caprolactam, nonanoyl caprolactam, decanoyl caprolactam, n-octanoyl valerolactam, 3,5,5-trimethylhexanoyl valerolactam, nonanoyl valerolactam, decanoyl valerolactam, nitrobenzoyl caprolactam, nitrobenzoyl valerolactam, and mixtures thereof. Particularly preferred are the bleach activators which are liquid or oil at room temperature. Examples of liquid bleach activators are acetyl triethyl citrate, n-octanoyl caprolactam, 3,5,5-trimethylhexanoyl caprolactam, nonanoyl caprolactam, decanoyl caprolactam, and mixtures thereof. The present compositions can optionally comprise aryl benzoates, such as phenyl benzoate.

Pretreatment Process—Although preferred application of the compositions described herein is laundry pretreatment, the compositions according to the present invention may also be used as a laundry detergent or as a laundry detergent booster and as a household cleaner in the bathroom or in the kitchen, for the cleaning of dishes or for the cleaning of carpets.

Said composition may remain in contact with the fabric, typically for a period of 1 minute to 24 hours, preferably 1 minute to 1 hour, and more preferably 5 minutes to 30 minutes, or so as to avoid drying of the composition on the fabric. Optionally, when the fabric is soiled with encrusted stains/soils which otherwise would be relatively difficult to remove, the compositions according to the present invention may be rubbed and/or brushed, for example, by means of a sponge or a brush or simply by rubbing two pieces of fabric each against the other.

By "washing" it is to be understood herein to simply rinse the fabrics with water, or the fabrics may be washed with conventional compositions comprising at least one surface active agent, this by the means of a washing machine or simply by hand.

By "in its neat form" it is to be understood that the compositions described herein are applied onto the fabrics to be pre-treated without undergoing any dilution, i.e. they are applied in the form described herein.

Other Conventional Ingredients for Cleaning Compositions—The aqueous bleaching compositions herein typically will also comprise other optional conventional ingredients to improve or modify performance. Typical, non-limiting examples of such ingredients are disclosed hereinafter for the convenience of the formulator.

Organic Stabilizers—The compositions herein may also optionally contain organic stabilizers for improving the chemical stability of the composition, provided that such materials are compatible or suitably formulated. Organic stabilizers can be selected from the following group: monophenols such as 2,6-di-tert-butylphenol or 2,6-di-tert-butyl-4-methylphenol; diphenols such as 2,2'-methylenebis (4-methyl-6-tert-butylphenol) or 4,4'-methylenebis(2,6-di-tert-butylphenol); polyphenols such as 1,3,5-trimethyl-2,4,6-tris(3', 5'-di-tert-butyl-4-hydroxybenzyl)benzene; hydroquinones such as 2,5-di-tert-amylhydroquinone or tert-butylhydroquinone; aromatic amines such as N-phenyl-N'-(1,3-dimethylbutyl)-p-phenylenediamine or N-phenyl-α-napthylamine; dihydroquinolines such as 2,2,4-trimethyl-1,2-dihydro-quinoline; ethane-1-hydroxy-1,1-diphosphonate and other known phosphonates (see, for example, U.S. Pat. Nos. 3,159,581; 3,213,030; 3,422,021; 3,400,148 and 3,422,137), and mixtures thereof.

Organic stabilizers are typically used in the present compositions at levels from 0.01% to 5.0%, more preferably from 0.1% to 0.5%.

The peroxygen bleach-containing compositions according to the present invention may further comprise from 0.5% to 5%, preferably from 2% to 4% by weight of the total composition of an alcohol according to the formula HO—CR'R"—OH, wherein R' and R" are independently H or a $C_2$–$C_{10}$ hydrocarbon chain and/or cycle. Preferred alcohol according to that formula is propanediol.

Inorganic Stabilizers—Examples on inorganic stabilizers include sodium stannate and various alkali metal phosphates such as the well-known sodium tripolyphosphates, sodium pyrophosphate and sodium orthophosphate.

Detersive Surfactants—Surfactants are useful herein for their usual cleaning power and may be included in preferred embodiments of the instant compositions at the usual detergent-useful levels. Generally, surfactants will comprise from about 0.1% to about 50%, preferably from about 1% to about 30%, more preferably from about 5% to about 25%, by weight of the liquid bleaching compositions herein.

Nonlimiting examples of surfactants useful herein include the conventional $C_{11}$–$C_{18}$ alkylbenzene sulfonates ("LAS") and primary, branched-chain and random $C_{10}$–$C_{20}$ alkyl sulfates ("AS"); the $C_{10}$–$C_{18}$ secondary alkyl sulfates of the formula $CH_3(CH_2)_x(CHOSO_3\ M^+)CH_3$ and $CH_3(CH_2)y$ $(CHOSO_3\ M^+)CH_2CH_3$ where x and (y+1) are integers of at least about 7, preferably at least about 9, and M is a water-solubilizing cation, especially sodium; unsaturated sulfates such as oleyl sulfate; the $C_{10}$–$C_{18}$ alkyl alkoxy sulfates ("AEXS") especially those wherein x is from 1 to about 7; $C_{10-18}$ alkyl alkoxy carboxylates (especially the EO 1–5 ethoxycarboxylates); the $C_{10}$–$C_{18}$ glycerol ethers; the $C_{10}$–$C_{18}$ alkyl polyglycosides and their corresponding sulfated polyglycosides; and $C_{12}$–$C_{18}$ alpha-sulfonated fatty acid esters. Detersive surfactants may be mixed in varying proportions for improved surfactancy as is well-known in the art. Also optionally included in the compositions are conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxylate/propoxylates), $C_{12}$–$C_{18}$ betaines and sulfobetaines ("sultaines"), $C_{10}$–$C_{18}$ amine oxides, and the like, can also be included in the cleaning compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be employed. If high sudsing is desired, the branched-chain $C_{10}$–$C_{16}$ soaps may be used. Mixtures of anionic and nonionic surfactants are especially useful.

Builders—Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. High performance compositions typically comprise from about 10% to about 80%, more typically from about 15% to about 50% by weight, of the detergent builder. Lower or higher levels of builder, however, are not excluded.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt or "overbased". When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulfonic acid, and carboxymethyloxysuccinic acid, the various alkali metal, ammonium and substituted ammonium salts of polyacetic acids such as nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance due to their availability from renewable resources and their biodegradability. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also U.S. Pat. No. 3,723,322.

Fatty acids, e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing in laundry compositions, which may need to be taken into account by the formulator.

Where phosphorus-based builders can be used, and especially in hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used though such materials are more commonly used in a low-level mode as chelants or stabilizers.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulfates, and aluminosilicates.

Chelating Agents—The compositions herein may also optionally contain a transition-metal selective sequestrants or "chelating agents", e.g., iron and/or copper and/or manganese chelating agents, provided that such materials are compatible or suitably formulated. Chelating agents suitable for use herein can be selected from the group consisting of aminocarboxylates, phosphonates (especially the aminophosphonates), polyfunctionally-substituted aromatic chelating agents, and mixtures thereof. Without intending to be bound by theory, it is believed that the benefit of these materials is due in part to their exceptional ability to remove iron, copper and manganese ions from washing solutions by formation of soluble chelates; other benefits include inorganic film prevention or scale inhibition. Commercial chelating agents for use herein include the DEQUEST® series, and chelants from Monsanto, DuPont, and Nalco, Inc.

Aminocarboxylates useful as optional chelating agents are further illustrated by ethylenediaminetetracetates, N-hydroxyethylethylenediaminetriacetates, nitrilotriacetates, ethylenediamine tetraproprionates, triethylenetetraaminehexacetates, diethylenetriaminepentaacetates, and ethanoldiglycines, alkali metal, ammonium, and substituted ammonium salts thereof. In general, chelant mixtures may be used for a combination of functions, such as multiple transition-metal control, long-term product stabilization, and/or control of precipitated transition metal oxides and/or hydroxides.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A highly preferred biodegradable chelator for use herein is ethylenediamine disuccinate ("EDDS"), especially (but not limited to) the [S,S] isomer as described in U.S. Pat. No. 4,704,233, Nov. 3, 1987, to Hartman and Perkins. The trisodium salt is preferred though other forms, such as magnesium salts, may also be useful.

Another preferred chelator for use herein is of the formula:

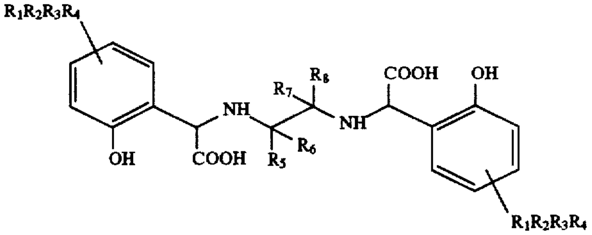

wherein $R_1$, $R_2$, $R_3$, and R4 are independently selected from the group consisting of —H, alkyl, alkoxy, aryl, aryloxy, —Cl, —Br, $—NO_2$, —C(O)R', and $—SO_2R$"; wherein R' is selected from the group consisting of —H, —OH, alkyl, alkoxy, aryl, and aryloxy; R" is selected from the group consisting of alkyl, alkoxy, aryl, and aryloxy; and $R_5$, $R_6$, $R_7$, and $R_8$ are independently selected from the group consisting of —H and alkyl.

Aminophosphonates are also suitable for use as chelating agents in the compositions of the invention when at least low levels of total phosphorus are permitted in detergent compositions, and include the ethylenediaminetetrakis (methylenephosphonates) and the diethylenetriaminepentakis (methylenephosphonates). Preferably, these aminophosphonates do not contain alkyl or alkenyl groups with more than about 6 carbon atoms.

If utilized, chelating agents or transition-metal-selective sequestrants will preferably comprise from about 0.001% to about 10%, more preferably from about 0.05% to about 1% by weight of the compositions herein.

Enzymes—Enzymes can be included in the instant compositions for a wide variety of fabric laundering or other cleaning purposes, including removal of protein-based, carbohydrate-based, or triglyceride-based stains, for example, and for the prevention of refugee dye transfer, and for fabric restoration. The enzymes to be incorporated include proteases, amylases, lipases, cellulases, and peroxidases, as well as mixtures thereof. Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders, etc. In this respect bacterial or fungal enzymes are preferred, such as bacterial amylases and proteases, and fungal cellulases. The enzymes useful herein may optionally be coated for protection in the aqueous formulation.

Enzymes are normally incorporated at levels sufficient to provide up to about 5 mg by weight, more typically about 0.01 mg to about 3 mg, of active enzyme per gram of the composition. Stated otherwise, the compositions herein will typically comprise from about 0.001% to about 5%, preferably 0.01%–1% by weight of a commercial enzyme preparation. Protease enzymes are usually present in such commercial preparations at levels sufficient to provide from 0.005 to 0.1 Anson units (AU) of activity per gram of composition.

Suitable examples of proteases are the subtilisins which are obtained from particular strains of *B. subtilis* and *B. licheniformis*. Another suitable protease is obtained from a strain of Bacillus, having maximum activity throughout the pH range of 8–12, developed and sold by Novo Industries A/S as ESPERASE®. The preparation of this enzyme and analogous enzymes is described in British Patent Specification No. 1,243,784 of Novo. Proteolytic enzymes suitable for removing protein-based stains that are commercially available include those sold under the tradenames ALCALASE® and SAVINASE® by Novo Industries A/S (Denmark) and MAXATASE® by International Bio-Synthetics, Inc. (The Netherlands). Other proteases include Protease A (see European Patent Application 130,756, published Jan. 9, 1985) and Protease B (see European Patent Application Serial No. 87303761.8, filed Apr. 28, 1987, and European Patent Application 130,756, Bott et al, published Jan. 9, 1985).

An especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76 in combination with one or more amino acid residue positions equivalent to those selected from the group consisting of +99, +101, +103, +107 and +123 in *Bacillus amyloliquefaciens* subtilisin as described in the patent applications of A. Baeck, C. K. Ghosh, P. P. Greycar, R. R. Bott and L. J. Wilson, entitled "Protease-Containing Cleaning Compositions" having U.S. Ser. No. 08/136,797 (P&G Case 5040), and "Bleaching Compositions Comprising Protease Enzymes" having U.S. Ser. No. 08/136,626.

Amylases include, for example, α-amylases described in British Patent Specification No. 1,296,839 (Novo), RAPIDASE®, International Bio-Synthetics, Inc. and TERMAMYL®, Novo Industries.

Cellulases usable in the present invention include both bacterial or fungal cellulases. Preferably, they will have a pH optimum of between 5 and 9.5. Suitable cellulases are disclosed in U.S. Pat. No. 4,435,307, Barbesgoard et al, issued Mar. 6, 1984, which discloses fungal cellulase produced from *Humicola insolens* and Humicola strain DSM1800 or a cellulase 212-producing fungus belonging to the genus Aeromonas, and cellulase extracted from the hepatopancreas of a marine mollusk (Dolabella Auricula Solander). Suitable cellulases are also disclosed in GB-A-2.075.028; GB-A-2.095.275 and DE-OS-2.247.832. CAREZYME® (Novo) is especially useful.

Suitable lipase enzymes for detergent use include those produced by microorganisms of the Pseudomonas group, such as *Pseudomonas stutzeri* ATCC 19.154, as disclosed in British Patent 1,372,034. See also lipases in Japanese Patent Application 53,20487, laid open to public inspection on Feb. 24, 1978. This lipase is available from Amano Pharmaceutical Co. Ltd., Nagoya, Japan, under the trade name Lipase P "Amano," hereinafter referred to as "Amano-P." Other commercial lipases include Amano-CES, lipases ex *Chromobacter viscosum*, e.g. *Chromobacter viscosum var. lipolyticum* NRRLB 3673, commercially available from Toyo Jozo Co., Tagata, Japan; and further *Chromobacter viscosum* lipases from U.S. Biochemical Corp., U.S.A. and Disoynth Co., The Netherlands, and lipases ex *Pseudomonas gladioli*. The LIPOLASE® enzyme derived from *Humicola lanuginosa* and commercially available from Novo (see also EPO 341,947) is a preferred lipase for use herein.

Peroxidase enzymes can be used in combination with oxygen sources, e.g., percarbonate, perborate, persulfate, hydrogen peroxide, etc. They are used for "solution bleaching," i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct.19, 1989, by O. Kirk, assigned to Novo Industries A/S.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985. Enzyme materials useful for liquid detergent formulations, and their incorporation into such formulations, are disclosed in U.S. Pat. No. 4,261,868, Hora et al, issued Apr. 14, 1981. Enzymes for use in detergents can be stabilized by various techniques. Enzyme stabilization techniques are disclosed and exemplified in U.S. Pat. No. 3,600,319, issued Aug. 17, 1971 to Gedge, et al, and European Patent Application Publication No. 0 199 405, Application No. 86200586.5, published Oct. 29, 1986, Venegas. Enzyme stabilization systems are also described, for example, in U.S. Pat. No. 3,519,570.

Polymeric Soil Release Agent—Any polymeric soil release agent known to those skilled in the art can optionally be employed in the compositions and processes of this invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

The polymeric soil release agents useful herein especially include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, (iii) poly (vinyl ester) segments, preferably polyvinyl acetate), having a degree of polymerization of at least 2, or (iv) $C_1$–$C_4$ alkyl ether or $C_4$ hydroxyalkyl ether substituents, or mixtures therein, wherein said substituents are present in the form of $C_1$–$C_4$ alkyl ether or $C_4$ hydroxyalkyl ether cellulose derivatives, or mixtures therein, and such cellulose derivatives are amphiphilic, whereby they have a sufficient level of $C_1$–$C_4$ alkyl ether and/or $C_4$ hydroxyalkyl ether units to deposit upon conventional polyester synthetic fiber surfaces and retain a sufficient level of hydroxyls, once adhered to such conventional synthetic fiber surface, to increase fiber surface hydrophilicity, or a combination of (a) and (b).

Typically, the polyoxyethylene segments of (a)(i) will have a degree of polymerization of from about 1 to about 200, although higher levels can be used, preferably from 3 to about 150, more preferably from 6 to about 100. Suitable oxy $C_4$–$C_6$ alkylene hydrophobe segments include, but are not limited to, end-caps of polymeric soil release agents such as $MO_3S(CH_2)_nOCH_2CH_2O$—, where M is sodium and n is an integer from 4–6, as disclosed in U.S. Pat. No. 4,721,580, issued Jan. 26, 1988 to Gosselink.

Polymeric soil release agents useful in the present invention also include cellulosic derivatives such as hydroxyether cellulosic polymers, copolymeric blocks of ethylene terephthalate or propylene terephthalate with polyethylene oxide or polypropylene oxide terephthalate, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (West Germany).

One type of preferred soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units contains 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from ICI). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoaroyl, end-capped terephthalate esters.

Still another preferred soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate. Said soil release agent also comprises from about 0.5% to about 20%, by weight of the oligomer, of a crystalline-reducing stabilizer, preferably selected from the group consisting of xylene sulfonate, cumene sulfonate, toluene sulfonate, and mixtures thereof. See U.S. Pat. No. 5,415,807, issued May 16, 1995, to Gosselink et al.

If utilized, soil release agents will generally comprise from about 0.01% to about 10.0%, by weight, of the detergent compositions herein, typically from about 0.1% to about 5%, preferably from about 0.2% to about 3.0%.

Other Ingredients—Detersive ingredients or adjuncts optionally included in the instant compositions can include one or more materials for assisting or enhancing cleaning performance, treatment of the substrate to be cleaned, or designed to improve the aesthetics of the compositions. Such materials are further illustrated in U.S. Pat. No. 3,936,537, Baskerville et al. Adjuncts which can also be included in compositions of the present invention, in their conventional art-established levels for use (generally from 0% to about 20% of the detergent ingredients, preferably from about 0.5% to about 10%), include other active ingredients such as dispersant polymers from BASF Corp. or Rohm & Haas; anti-tarnish and/or anti-corrosion agents, dyes, fillers, optical brighteners, germicides, hydrotropes, enzyme stabilizing agents, perfumes, solubilizing agents, clay soil removal/anti-redeposition agents, carriers, processing aids, pigments, solvents, fabric softeners, static control agents, etc.

Dye Transfer Inhibiting Agents—The compositions of the present invention may also include one or more materials effective for inhibiting the transfer of dyes from one dyed surface to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

More specifically, the polyamine N-oxide polymers preferred for use herein contain units having the following structural formula: R—$A_x$—P; wherein P is a polymerizable unit to which an N→O group can be attached or the N→O group can form part of the polymerizable unit or the N→O group can be attached to both units; A is one of the following structures: —NC(O)—, —C(O)O—, —S—, —O—, —N=; x is 0 or 1; and R is aliphatic, ethoxylated aliphatics, aromatics, heterocyclic or alicyclic groups or any combination thereof to which the nitrogen of the N→O group can be attached or the N→O group is part of these groups. Preferred polyamine N-oxides are those wherein R is a heterocyclic group such as pyridine, pyrrole, imidazole, pyrrolidine, piperidine and derivatives thereof.

The N→O group can be represented by the following general structures:

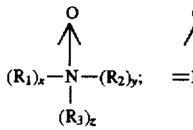

wherein $R_1$, $R_2$, $R_3$ are aliphatic, aromatic, heterocyclic or alicyclic groups or combinations thereof; x, y and z are 0 or 1; and the nitrogen of the N→O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000. This preferred class of materials can be referred to as "PVNO". The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., *Chemical Analysis*, Vol 113. "Modern Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present invention compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

Suds Boosters—If high sudsing is desired, suds boosters such as $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$, and the like, can be added at levels of, for example, 0.1% –2%, to provide additional suds and to enhance grease removal performance.

Brightener—Any optical brighteners, fluorescent whitening agents or other brightening or whitening agents known in the art can be incorporated in the instant compositions when they are designed for fabric treatment or laundering, at levels typically from about 0.05% to about 1.2%, by weight, of the detergent compositions herein. Commercial optical brighteners which may be useful in the present invention can be classified into subgroups, which include, but are not necessarily limited to, derivatives of stilbene, pyrazoline, coumarin, carboxylic acids, methinecyanines, dibenzothiophene-5,5-dioxide, azoles, 5- and 6-membered-ring heterocyclic brighteners, this list being illustrative and non-limiting. Examples of such brighteners are disclosed in "The Production and Application of Fluorescent Brightening Agents", M. Zahradnik, Published by John Wiley & Sons, New York (1982).

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM;

available from Ciba-Geigy; Artic White CC and Artic White CWD, available from Hilton-Davis, located in Italy; the 2-(4-styryl-phenyl)-2H-naphthol[1,2-d]triazoles; 4,4'-bis-(1,2,3-triazol-2-yl)-stil-benes; 4,4'-bis(styryl)bisphenyls; and the aminocoumarins. Specific examples of these brighteners include 4-methyl-7-diethyl- amino coumarin; 1,2-bis (-benzimidazol-2-yl)ethylene; 2,5-bis(benzoxazol-2-yl) thiophene; 2-styryl-napth-[1,2-d]oxazole; and 2-(stilbene-4-yl)-2H-naphtho- [1,2-d]triazole. See also U.S. Pat. No. 3,646,015, issued Feb. 29, 1972 to Hamilton. Anionic brighteners are typically preferred herein.

Coating—Various detersive ingredients employed in the present compositions optionally can be further stabilized by absorbing said ingredients into a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT® D10, Degussa) is admixed with a proteolytic enzyme solution containing 3%–5% of $C_{13-15}$ ethoxylated alcohol (EO 7) nonionic surfactant. Typically, the enzyme/surfactant solution is 2.5 × the weight of silica. The resulting powder is dispersed with stirring in silicone oil (various silicone oil viscosities in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergents, including liquid laundry detergent compositions.

The compositions herein can contain other fluids as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5% to 90%, typically 10% to 50% of such carriers.

Bleach catalysts—If desired, compositions herein may additionally incorporate a catalyst or accelerator to further improve bleaching or soil removal. Any suitable bleach catalyst can be used. For detergent compositions used at a total level of from about 1,000 to about 5,000 ppm in water, the composition will typically deliver a concentration of from about 0.1 ppm to about 700 ppm, more preferably from about 1 ppm to about 50 ppm, or less, of the catalyst species in the wash liquor.

Typical bleach catalysts comprise a transition-metal complex, for example one wherein the metal co-ordinating ligands are quite resistant to labilization and which does not deposit metal oxides or hydroxides to any appreciable extent under the typically alkaline conditions of washing. Such catalysts include manganese-based catalysts disclosed in U.S. Pat. Nos. 5,246,621, 5,244,594; 5,194,416; 5,114,606; and EP Nos. 549,271 A1, 549,272 A1, 544,440 A2, and 544,490 A1; preferred examples of these catalysts include $Mn^{IV}_2(\mu\text{-}O)_3(TACN)_2\text{-}(PF_6)_2$, $Mn^{III}_2(\mu\text{-}O)_1(\mu\text{-}OAc)_2(TACN)_2(ClO_4)_2$, $Mn^{IV}_4(\mu\text{-}O)_6(TACN)_4(ClO_4)_4$, $Mn^{III}Mn^{IV}_4\text{-}(\mu\text{-}O)_1(\mu\text{-}OAc)_2\text{-}(TACN)_2\text{-}(ClO_4)_3$, $Mn^{IV}\text{-}(TACN)\text{-}(OCH_3)_3(PF_6)$, and mixtures thereof wherein TACN is trimethyl-1,4,7-triazacyclononane or an equivalent macrocycle; though alternate metal-co-ordinating ligands as well as mononuclear complexes are also possible and monometallic as well as di- and polymetallic complexes and complexes of alternate metals such as iron or ruthenium are all within the present scope. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos.: 4,728,455; 5,284,944; 5,246,612; 5,256,779; 5,280,117; 5,274,147; 5,153,161; and 5,227,084.

Transition metals may be precomplexed or complexed in-situ with suitable donor ligands selected in function of the choice of metal, its oxidation state and the denticity of the ligands. Other complexes which may be included herein are those of U.S. application Ser. No. 08/210,186, filed Mar. 17, 1994.

Pretreater Formulation—The preferred compositions of the present invention have a viscosity 50 cps or greater at 20° C. when measured with a Brookfield viscometer at 50 rpm with a spindle n°3, more preferably of from about 50 to about 2000 cps, and still more preferably of from about 200 to about 1500 cps. Any surfactant system or polymeric thickener known in the art to increase the viscosity of a composition can be used to achieve the preferred viscosity. Thus the surfactants suitable to be used herein may be thickening surfactants such as nonionic, anionic, cationic, zwitterionic and/or amphotheric surfactants.

The bleaching composition herein comprise water in any amount up to about 95% by weight of the total composition. Preferably, the compositions herein will comprise from about 5% to about 95%, more preferably from about 10% to about 90%, by weight of the bleaching composition, of water.

When the peroxygen bleach-containing compositions according to the present invention further comprise an optional bleach activator, it is highly desired herein to formulate said compositions either as a microemulsion or as a stable emulsion.

When formulated as a microemulsion, the composition comprises the bleach activator in a matrix of water, the peroxygen bleach, and hydrophilic anionic and nonionic surfactants. Suitable anionic surfactants herein include the alkyl benzene sulfonates, alkyl sulfates, alkyl alkoxylated sulfates, and mixtures thereof. Suitable nonionic surfactants for use in the microemulsions herein include the hydrophilic nonionic surfactants as defined hereinafter for the emulsions according to the present invention.

When formulated as an emulsion, the composition comprises at least a hydrophilic surfactant having an HLB (hydrophilic-lipophilic balance) above 10 and at least a hydrophobic surfactant having an HLB up to 9, wherein said bleach activator is emulsified by said surfactants. The two different surfactants in order to form emulsions which are stable must have different HLB values, and preferably the difference in value of the HLBs of said two surfactants is at least 1, preferably at least 3. In other words, by appropriately combining at least two of said surfactants with different HLBs in water, stable emulsions will be formed, i.e. emulsions which do not substantially separate into distinct layers, upon standing for at least two weeks at 50° C. The emulsions comprise from about 2 % to about 50%, by weight of the total composition, of said hydrophilic and hydrophobic surfactants, preferably from about 5% to about 40%, and more preferably from about 8% to about 30%. The emulsions comprise at least about 0.1%, preferably at least 3%, more preferably at least 5%, by weight of the total emulsion, of one or more hydrophobic surfactant and at least about 0.1%, preferably at least 3%, more preferably at least 5%, by weight of the total emulsion, of one or more hydrophilic surfactant. Preferred to be used herein are the hydrophobic nonionic surfactants and hydrophilic nonionic surfactants. Said hydrophobic nonionic surfactants to be used herein have an HLB up to 9, preferably below 9, more preferably below 8 and said hydrophilic surfactants have an HLB above 10, preferably above 11, more preferably above 12. Suitable nonionic surfactants for use herein include alkoxylated fatty alcohols, preferably fatty alcohol ethoxylates and/or propoxylates. A variety of alkoxylated fatty alcohols are commercially available which have very different HLB values. For further discussion of HLB theory and its application to the formation of emulsions, please see the: *Encyclopedia of Emulsion Technology*; Becher, P., Ed.; Marcel Dekker, Inc.: New York, 1985; Volumes 1 and 2, and references cited therein.

In a particularly preferred embodiment of the emulsion, if present, wherein the emulsions comprise acetyl triethyl citrate as the bleach activator, an adequate nonionic surfactant system would comprise a hydrophobic nonionic surfactant with, for instance, an HLB of 6, such as a Dobanol® 23-2 and a hydrophilic nonionic surfactant with, for instance, an HLB of 15, such as a Dobanol® 91-10. Other suitable nonionic surfactant systems comprise for example a Dobanol® 23-6.5 (HLB about 12) and a Dobanol® 23 (HLB below 6) or a Dobanol® 45-7 (HLB=11.6) and Lutensol® TO3 (HLB=8). Dobanol® are commercially available nonionic surfactants available from Shell Corp. Lutensol® are commercially available nonionic surfactants available from BASF Corp.

The peroxygen bleach-containing compositions according to the present invention may further comprise an amine oxide surfactant according to the formula $R^1R^2R^3NO$, wherein each of $R^1$, $R^2$ and $R^3$ is independently a $C_6$–$C_{30}$, preferably a $C_{10}$–$C_{30}$, most preferably a $C_{12}$–$C_{16}$ hydrocarbon chain. It has been further observed that in a pretreatment process, the presence of said amine oxide further improves the cleaning performance on particulate and/or greasy stains. It is believed that this improvement in cleaning performance is matrix independent. To obtain either of these benefits, amine oxides, if present, should be present in amounts ranging from 0.1% to 10% by weight of the total composition, preferably from 1.5% to 3%.

Articles of Manufacture—Preferred articles include the compositions herein that are suitable for use in the processes described herein, in a package that can provide direct application of said compositions onto soiled fabrics. Preferably the composition is packaged in a pliable container fitted with an applicator cap. Suitable containers include those that permit application directly onto soiled fabric by squeezing or pouring the compositions through the applicator cap. Such containers include those described in U.S. Pat. No. 4,107,067. Appropriate applicator caps include, but are not limited to, fountain type nozzles, brush applicators, roller ball applicators, and flip-top caps. The containers useful for the processes described herein contain from about 4 ounces to about 32 ounces, preferably from about 4 ounces to about 24 ounces, of the compositions described herein.

The following examples illustrate the compositions of this invention, but are not intended to be limiting thereof. All materials in the Examples satisfy the functional limitations herein.

EXAMPLE I

The following compositions were made by mixing the listed ingredients in the listed proportions (weight % unless otherwise specified).

| Compositions | I | II | III | IV | V |
|---|---|---|---|---|---|
| Na $C_{10}$–$C_{18}$ alkylsulphate | 2 | 2 | 2 | 2 | 2 |
| Dobanol ® 45-7 | 8.6 | 8.6 | 8.6 | 8.6 | 8.6 |
| Dobanol ® 23-3 | 6.4 | 6.4 | 6.4 | 6.4 | 6.4 |
| ATC | 3.5 | 3.5 | 3.5 | 3.5 | 3.5 |
| $H_2O_2$ | 6 | 6 | 6 | 6 | 6 |
| BHT[2] | 0.05 | 0.05 | 0.05 | 0.05 | 0.05 |
| Salicylic acid[1] | — | 1.5 | — | — | — |
| Malonic acid[1] | — | — | 1.5 | — | — |
| Glycine[1] | — | — | — | 1 | — |
| Glutamic acid[1] | — | — | — | — | 1.5 |
| Water and minors* | | | up to 100% | | |
| $H_2SO_4$ up to pH 4 | | | | | |

[1]fabric protection agents
*minors include perfumes, dyes, etc.
[2]butylated hydroxy toluene Composition I comprises hydrogen peroxide and is free of a fabric protection agent. Compositions II to V contain a fabric protection agent which are representative of the present invention.

The compositions in Example I differ only in the identity of the fabric protection agent. Thus, to compare the tensile strength loss of fabrics treated with peroxygen bleaching compositions containing potential fabric protection agents, this formulation is used as the basic peroxygen bleaching composition to which the subject fabric protection agent is added.

EXAMPLE II

Tensile strength test method—The tensile strength loss of fabrics can be determined by the following: Krefeld cotton ribbons (dimension 12.5×5 $cm^2$) having a copper(2+) concentration of 30 ppm per gram of cotton are treated with 2 ml of the test composition according to Example I. The test composition is left in contact with the ribbons for 24 hours. The ribbons are then rinsed with water, and the tensile strength loss measured with an INSTRON, model no. 4411. Damage on the cotton ribbons is evaluated by stretching said ribbons until they break. The force necessary to break the ribbons, i.e. the Ultimate Tensile Stress, is measured while the ribbons are wet with a INSTRON, model 4411. The lower the force needed to break the cotton ribbons, the more serious is the damage caused on the fabrics. A good confidence (standard deviation=2-4 Kg) in the results is obtained using five replicates for each test.

The tensile strength loss measured above for the test composition is expressed as a percentage and is obtained by dividing the tensile strength of a reference cotton ribbon, i.e. a ribbon which has not been treated with a bleaching composition, by the tensile strength of the test ribbon pretreated by the test composition.

Results are as follows:

| Composition | I | II | III | IV | V |
|---|---|---|---|---|---|
| Tensile strength loss (%) | 69 | 11 | 19 | 40 | 45 |

30 ppm Copper per gram of fabric, pretreatment for 24 hours

The above results clearly show the unexpected improvement in tensile strength loss (i.e., lower numerical values) obtained by using bleaching compositions according to the present invention comprising a peroxygen bleach and a fabric protection agent as compared to the use of the same bleaching composition but without a fabric protection agent (composition I). The tensile strength loss is reduced when pretreating fabrics with compositions according to the present invention (see compositions II to VI), even upon a prolonged contact time, i.e., 24 hours and in presence of a high concentration of copper on the surface of said fabrics, i.e., 30 ppm per gram of cotton fabric.

EXAMPLE III

The following compositions were made by mixing the listed ingredients in the listed proportions (weight % unless otherwise specified).

| Composition 1 | A | B | C | D |
|---|---|---|---|---|
| $H_2O_2$ | 6 | 6 | 6 | 6 |
| ATC | 3.5 | 3.5 | 3.5 | 3.5 |
| Na $C_{10}$–$C_{18}$ alkylsulphate | 2 | 2 | 2 | 2 |
| Dobanol 23-3 | 15 | 15 | 15 | 15 |
| Glycine[1] | 1 | — | — | — |
| Salicylic acid[1] | — | 1.5 | — | — |
| Malonic acid[1] | — | — | 1.5 | — |
| Glutamic acid[1] | — | — | — | 1.5 |
| Water and minors* | | up to 100% | | |
| $H_2SO_4$ up to pH 4 | | | | |

| Composition 2 | A | B | C | D |
|---|---|---|---|---|
| $H_2O_2$ | 6 | 6 | 6 | 6 |
| ATC | 3.5 | 3.5 | 3.5 | 3.5 |
| Na $C_{10}$–$C_{18}$ alkylsulphate | 12 | 12 | 12 | 12 |
| Dobanol ® 23-3 | 12 | 12 | 12 | 12 |
| Glycine[1] | 1 | — | — | — |
| Salicylic acid[1] | — | 1.5 | — | — |
| Malonic acid[1] | — | — | 1.5 | — |
| Glutamic acid[1] | — | — | — | 1.5 |
| Water and minors* | | up to 100% | | |
| $H_2SO_4$ up to pH 4 | | | | |

| Composition 3 | A | B | C | D |
|---|---|---|---|---|
| $H_2O_2$ | 7 | 7 | 7 | 7 |
| Na $C_{10}$–$C_{18}$ alkylsulphate | 2 | 2 | 2 | 2 |
| Dobanol ® 23-3 | 3 | 3 | 3 | 3 |
| Glycine[1] | 1 | — | — | — |
| Salicylic acid[1] | — | 1.5 | — | — |
| Malonic acid[1] | — | — | 1.5 | — |
| Glutamic acid[1] | — | — | — | 1.5 |
| Water and minors* | | up to 100% | | |
| $H_2SO_4$ up to pH 4 | | | | |

[1]fabric protection agent
*minors include perfumes and dyes

Krefeld cotton ribbons were treated with Compositions A to D in the same manner as described for the compositions in Example I.

The tensile strength loss is reduced when pretreating fabrics with Compositions A to D of this example, even upon a prolonged contact time, i.e., 24 hours, and in the presence of a high concentration of copper on the surface of the fabrics, i.e., 30 ppm per gram of cotton fabric.

Also when using compositions A to D on colored fabrics in the same manner as above, no dye change and/or discoloration is observed.

What is claimed is:

1. An aqueous bleaching composition comprising an effective amount of a peroxygen bleach and a fabric protection agent wherein said fabric protection agent is selected from the group consisting of 5-bromosalicylic acid, 5-chlorosalicylic acid, conjugate base salts thereof, and mixtures thereof.

2. An aqueous bleaching composition according to claim 1 which has a pH of from greater than 0 to about 6 and a viscosity of from about 50 to about 2000 cps at 20° C. when measured with a Brookfield viscometer at 50 rpm with a spindle n°3.

3. An aqueous bleaching composition according to claim 1 wherein said composition comprises from about 0.3% to about 3%, by weight of the total composition, of said fabric protection agent.

4. An aqueous bleaching composition according to claim 3 wherein said peroxygen bleach is hydrogen peroxide or a water soluble source thereof and is present in an amount of from about 0.5% to about 20% by weight of the total composition.

5. An aqueous bleaching composition according to claim 4 wherein said peroxygen bleach is present in an amount of from about 1% to about 6% by weight of the total composition.

6. An aqueous bleaching composition according to claim 4 wherein said composition further comprises from about 0.5% to about 20% by weight of the total composition of a bleach activator.

7. An aqueous bleaching composition according to claim 6 wherein said bleach activator is selected from the group consisting of acetyl triethyl citrate, n-octanoyl caprolactam, 3,5,5-trimethylhexanoyl caprolactam, nonanoyl caprolactam, decanoyl caprolactam, n-octanoyl valerolactam, 3,5,5-trimethylhexanoyl valerolactam, nonanoyl valerolactam, decanoyl valerolactam, nitrobenzoyl caprolactam, nitrobenzoyl valerolactam, and mixtures thereof.

8. An aqueous bleaching composition according to claim 6 wherein said composition is formulated as a microemulsion of said bleach activator in a matrix comprising water, said peroxygen bleach, and a hydrophilic surfactant system comprising an anionic and a nonionic surfactant.

9. An aqueous bleaching composition according to claim 6, said composition being formulated as an aqueous emulsion comprising at least a hydrophilic surfactant having an HLB above 10 and at least a hydrophobic surfactant having an HLB up to 9, wherein said bleach activator is emulsified by said surfactants.

10. An aqueous bleaching composition according to claim 6 wherein said bleach activator is a liquid or oil at room temperature.

11. An aqueous bleaching composition according to claim 10 wherein said bleach activator is selected from the group consisting of acetyl triethyl citrate, n-octanoyl caprolactam, 3,5,5-trimethylhexanoyl caprolactam, nonanoyl caprolactam, decanoyl caprolactam, and mixtures thereof.

* * * * *